United States Patent [19]

Brooks

[11] Patent Number: 5,001,738
[45] Date of Patent: Mar. 19, 1991

[54] DENTAL X-RAY FILM HOLDING TAB AND ALIGNMENT METHOD

[76] Inventor: Jack D. Brooks, 3143 Crane Ferry Rd., Augusta, Ga. 30907

[21] Appl. No.: 334,467

[22] Filed: Apr. 7, 1989

[51] Int. Cl.$^5$ ............................................... A61B 6/14
[52] U.S. Cl. .................................... 378/170; 378/168; 378/205
[58] Field of Search ................ 378/168, 169, 170, 205

[56] References Cited

U.S. PATENT DOCUMENTS

| | | | |
|---|---|---|---|
| 1,012,561 | 12/1911 | Ketcham | 378/168 |
| 1,467,876 | 9/1923 | Raper | 378/168 |
| 1,974,936 | 9/1934 | Vloch | 378/168 |
| 2,240,336 | 4/1941 | Krieder | 378/168 |
| 2,274,808 | 3/1942 | Rinn | 378/168 |
| 2,553,028 | 5/1951 | Wright | 378/170 |
| 3,777,141 | 12/1973 | Eggen | 378/170 |
| 4,707,847 | 11/1987 | Van Aken | 378/169 |

*Primary Examiner*—Carolyn E. Fields
*Assistant Examiner*—David P. Porta
*Attorney, Agent, or Firm*—William M. Hobby, III

[57] ABSTRACT

A dental x-ray film holder has a film packet for holding x-ray film and is sized to fit adjacent one or more teeth in a patient's mouth. A bite tab is attached to and extends from the film packet for gripping between the teeth to hold the film packet in place adjacent the teeth. An aligning system is provided on the bite tab for aiming an x-ray tube directly at the film packet adjacent the teeth and includes an opening in the bite tab for properly positioning the film packet adjacent a tooth. At least two aiming lines extend across one side of the bite tab and film packet and a center of film indication is on the bite tab. A method of aligning an x-ray tube for x-raying a patient's teeth includes making the x-ray film holder having the film packet holding the x-ray film with a bite tab having aiming lines and a center of film line thereon, the aligning the x-ray tube with the lines on the bite tab, and x-raying a patient's teeth with the x-ray tube aligned on the bite tab. The method includes the step of making the bite tab with an opening therethrough and through at least one aiming line positioning on a patient's teeth.

8 Claims, 2 Drawing Sheets

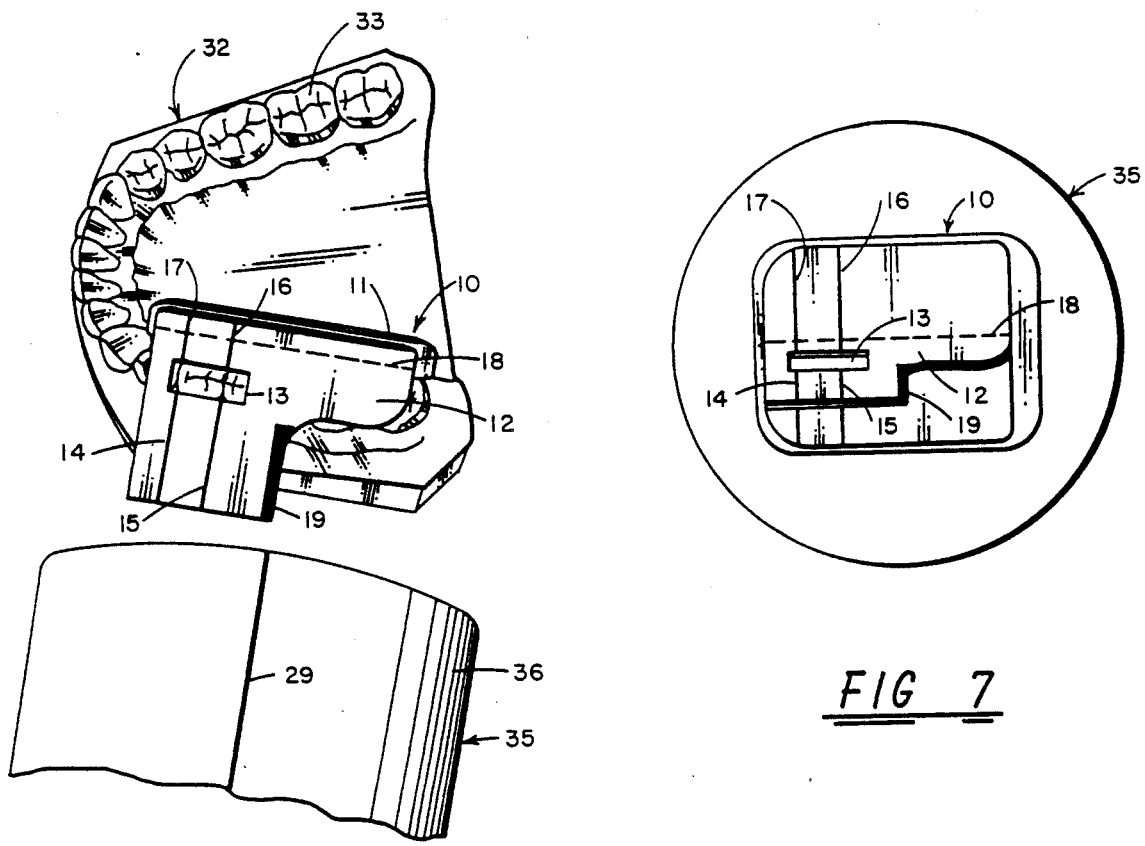
FIG. 5
FIG. 7
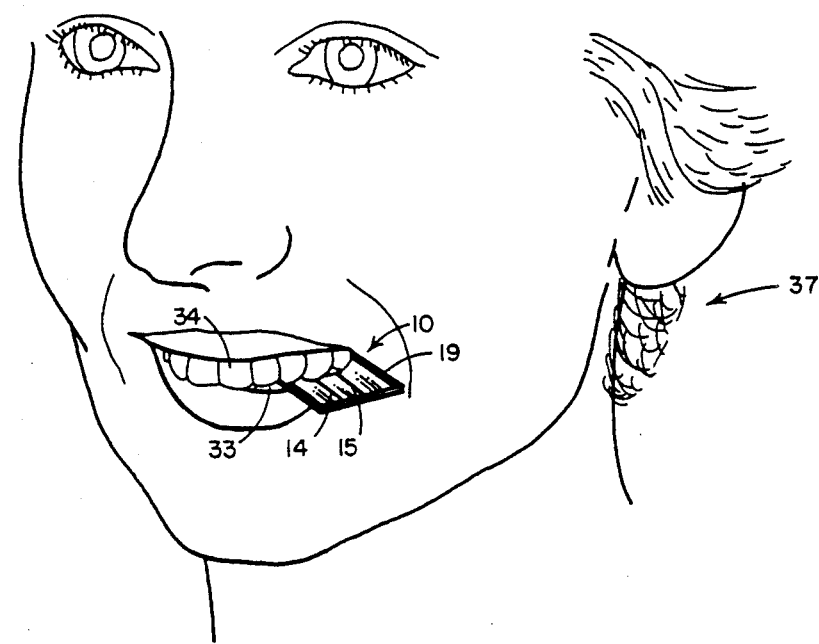
FIG. 6

DENTAL X-RAY FILM HOLDING TAB AND ALIGNMENT METHOD

BACKGROUND OF THE INVENTION

The present invention relates to a dental x-ray film holder and a method of aligning an x-ray tube with an x-ray film holder in a patient's mouth.

Intra-oral radiographs or x-rays are taken in general dental practices in an enormous and increasing number every year. Since the late 1920's, patients have been required to bite on tabs during bitewing x-ray examination. Over a period of years, dentists will accumulate a series of radiographs of his patients. which offers the dentist aid in diagnosing oral diseases as well as monitoring the patient's therapy. If the radiographs are of good quality and have been taken from similar angles, then the progression of approximal caries and the condition of the alveolar support may be realistically assessed. Unfortunately in many cases, little attention is given to the standarization of technique such as to allow variable comparisons, especially in the variables concerning the film position relative to the object and position of the x-ray tube in the x-ray focus.

Normal practice has been to hold film packets in place by a variety of film holding devices have been produced over the years for use in intra-oral radiography. A great variety of simple bitewing film holders have become available and these include self-adhesive tabs, slide-on cardboard loops, polystyrene, styrofoam, wood and plastic blocks, with or without localizing pointers. These simple holders have the advantage that they usually are better tolerated by the patients who may find the more elaborate film holdering aiming devices uncomfortable to bite on and therefore causing difficulty in maintaining film placement.

In recent years, there have been attempts made to aid in the free hand positioning of the x-ray tube head in order to achieve optimum beam angulation. This is particularly important for the bitewing projection in order to diagnose small carious lesions and avoid artifactual overlapping of contact areas. There have been extra oral aiming rods attached to film holders as well as the use of a target distance localizer fixed to the x-ray tube head consisting of a wire ring at the end of a long rod.

The prior patents for intra-oral dental x-ray film holders include the Ketcham patent for a mouth film holder for x-rays, U.S. Pat. No. 1,012,561 and the Raper U.S. Pat. No. 1,467,876 for a film packet for x-ray work. In the Vloch U.S. Pat. No. 1,974,936, a holder for x-ray film packets include wrapping the bite tab completely around a film packet. In the Kreider U.S. Pat. No. 2,240,336, a dental x-ray film holder has a bite tab extending from the film holder which has flange grooves for holding the film packet. In the Rinn U.S. Pat. No. 2,274,808, a bitewing for dental film packs has the tab completely surrounding the film packet. These typical prior intra-oral film holders of the bitewing type have various means for holding the bitewing or bite tab to the film packet but do not have means to align the film packet and teeth with the x-ray tube.

There have been bitewing instruments manufactured and commercially available for use in aligning film packets during a bitewing x-ray examination. These include the Rinn instrument which contains a ring on a connecting rod to be positioned which in turn has a film holder for holding the film packet thereon in the Rinn bitewing holder The Precision Instrument alignment apparatus operates in a similar manner. These beaming devices are claimed to be of great practical use in routine intra-oral radiography in helping operators achieve standardized technique with a reduction in the x-ray dosage and improvement in the image quality of the x-ray. The disadvantages with the aiming devices is that the discomfort in biting interferes with correct film placement.

Three major problems in producing a quality radiograph are horizontal overlap, concculling and poor film positioning thereby not maximizing number of teeth exposed on the film. The cause of horizontal overlap is that the primary beam is not directed at a right angle between the contacts of adjacent teeth. The cause of conecutting is that the x-ray tube does not completely cover the film therefore the x-rays do not irradiate the film in certain areas.

The present invention relates to a simplified bitewing x-ray film holder for intra-oral x-ray having alignment techniques added to the bitewing film holding tab and to a method of aligning the x-ray tube head with the bitewing film holding tab in a more accurate and standardized manner.

SUMMARY OF THE INVENTION

A dental x-ray film holder for taking intra-oral x-rays has a film packet for holding x-ray film and is of a predetermined size to fit adjacent at least one tooth in a patient's mouth. An elongated bite tab is attached to and extends from the film packet and is adapted to be gripped between the teeth and protrude from the mouth to hold a film packet adjacent the teeth. Alignment means on the bite tab are for aiming an x-ray tube directly at the film packet held adjacent the teeth for x-raying the teeth and includes an opening through the bite tab to allow alignment with the patient's teeth and at least one aiming or alignment line on the bite tab positioned for alignment of the x-ray tube. A pair of alignment lines are preferred on the bite tab with at least one extending through the opening in the bit tab. A pair of alignment lines may also be on the film packet extending perpendicular from the alignment lines on the bite tab and positioned for aligning the x-ray tube.

The method of aligning an x-ray tube for x-raying a patient's teeth comprises the steps of: making an x-ray film holder having a film packet holding x-ray film and a bite tab having aiming lines for aiming an x-ray tube thereon. Aligning an x-ray tube with the alignment lines on the bite tab and x-raying the patient's teeth with the x-ray tube aligned on the bite tab to aid the alignment of the x-ray tube with the patient's teeth being x-rayed. The method may include a dental x-ray holder having an opening in the bite tab for positioning on the patient's teeth and two alignment lines positioned on the bite tab and two more alignment lines positioned on the film packet for aiding in the alignment of the x-ray tube.

BRIEF DESCRIPTION OF THE DRAWINGS

Other objects, features, and advantages of the present invention will be apparent from the written description and the drawings in which:

FIG. 5 shows a top perspective view of the dental x-ray film holder positioned on the teeth adjacent the x-ray tube;

FIG. 6 is a perspective view of the dental x-ray film holder in a patient's mouth; and FIG. 7 is a sectional view of the tab being aligned in the x-ray tube.

DESCRIPTION OF THE PREFERRED EMBODIMENTS

Figure 1:
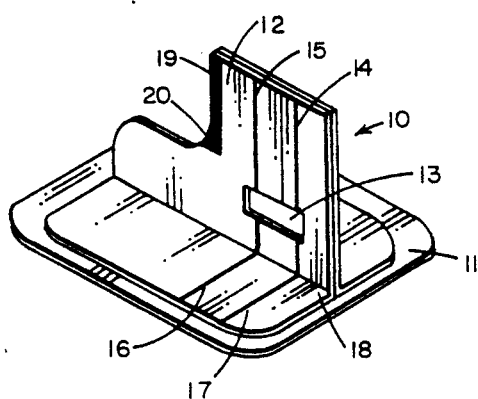
FIG. 1 shows a perspective view of a dental intra-oral x-ray film holder in accordance with the present invention.
Figure 2:
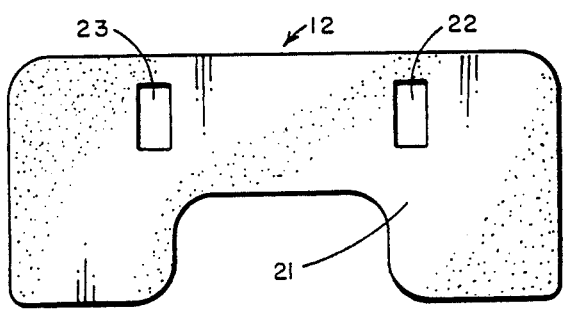
FIG. 2 shows a rear elevation of the bite tab for attaching to a film packet.
Figure 3:
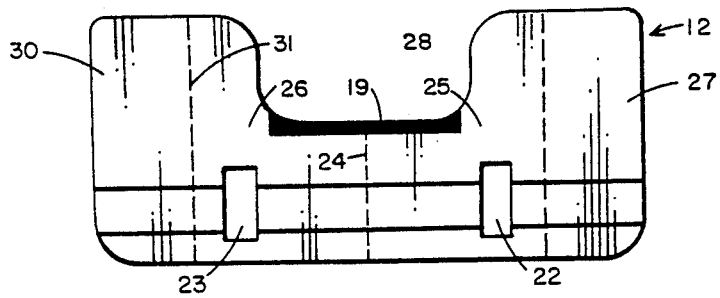
FIG. 3 shows a top plan view of the bite tab of FIGS. 1 and 2.

Referring to the drawings and especially to FIGS. 1 through 3, a dental intra-oral x-ray film holder 10 is seen in FIG. 1 having a film packet 11 for holding x-ray film therein and having a predetermined size to fit adjacent the teeth and the mouth of a patient. The bitewing film holder 10 has a bite tab 12 extending perpendicular from the film holder 11 and having an opening 13 therethrough positioned in a predetermined position to allow alignment on a patient's teeth. A bite tab 12 has a pair of alignment lines 14 and 15 passing thereacross and across the opening 13. The alignment lines 14 and 15 also extend on the other side of the bite tab. A pair of lines 16 and 17 extend perpendicular to the lines 14 and 15 on the bite tab 12 base and connect with the lines 14 and 15 at the bend 18. The bite tab 12 has a generally square shape with a curved cutaway portion 20 along one edge. The cut-a-way portion aligns with the center of the film packet 11 to allow better aiming of the x-ray tube. A line 19 may be placed along the edge 24. This, however, is only one shape of any number of shapes anticipated for the bite tabs.

FIG. 2 shows the bottom of the bite tab 12 before being attached to the film packet 11 while FIG. 3 shows a top plan view of the bite tab 12 of FIG. 2. FIG. 2 has the back surface 21 coated with an adhesive and has a pair of openings 22 and 23. As seen in FIG. 3, bite tab 12 is folded on the fold line 24 which brings the openings 22 and 23 into direct alignment so that the adhesive can attach the portions 25 and 26 together to form the extending part of the bite tab while end 27 is folded on the fold line 28 and end portion 30 is folded on the fold line 31 so that the end portions 27 and 30 cover most of the film packet portion 11 and allow the adhesive surface thereon to attach directly on top of an existing film packet which already has the x-ray film mounted between paper or plastic materials to seal the film from light radiation.

Figure 4:
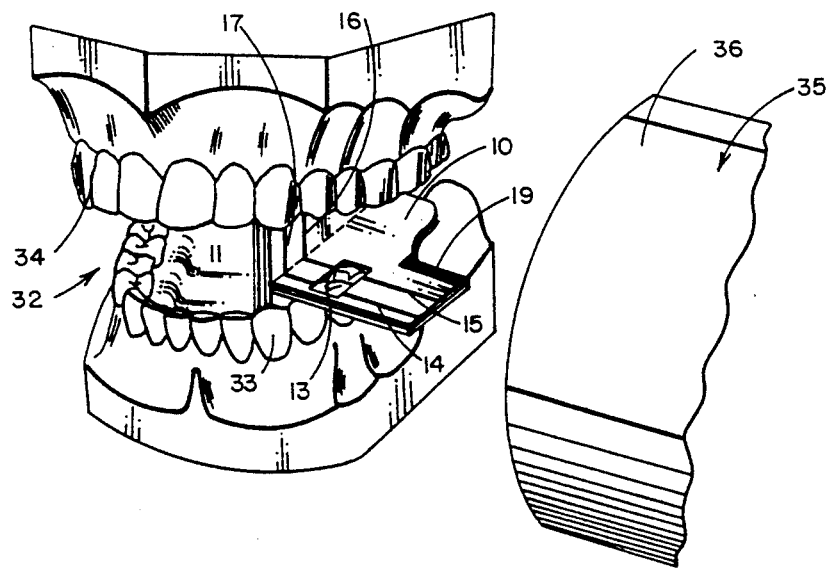
FIG. 4 is a perspective view of the film holder of FIG. 1 placed between a patient's teeth with an x-ray tube being aligned therewith.

In FIG. 4, the film holder 10 is positioned in a patient's mouth 32 and positioned with parallel lines 14 running at right angles through the contacts of the first premolars. The opening 13 allows the position of the line 14 on the teeth to be x-rayed. The film holder is held by the upper teeth 34 when the patient closes on the tab as shown in FIG. 6. An x-ray tube 35 has the head 36 aligning on the lines 14 and 15 and on the lines 17 and 16 to align the x-ray tube 35 in a direct position and alignment with the x-ray film packet 11 in order to x-ray the teeth positioned in the opening 13, as more clearly seen in FIG. 5 in which the bite tab is positioned on the first pre-molar tooth with orienting lines 14 and 15. The top line 29 on an x-ray tube is aligned parallel to lines 14 and 15 and runs into the red line 19 on the bite tab. In FIG. 6, a patient 37 is biting on the film holder 10, bit tab 11 and the lines 14 and 15 can be seen to protrude from between the first premolar so as to provide alignment even after the teeth are clamped onto the bite tab. The bite tab is elongated to extend from the mouth to allow alignment with the mouth closed.

FIG. 7 shows a view through the x-ray tube 35 of the film holder 10 in which the x-ray tube is aligned across the opening 13 of the bit tab 12 in alignment with the lines 14 and 15 and 19 on the bite tab and in alignment with the lines 16 and 17 on the bite tab perpendicular to the lines 14 and 15.

The method in accordance with the present invention includes aligning x-ray tube for x-raying a patient's teeth by first making a dental x-ray film holder in accordance with FIGS. 1, 2 and 3 having a film pocket 11 and a bite tab 12 having aiming lines 14, 15, 16, 17 and 19 on the bite tab and forming an opening 13 in the bite tab 12 through the lines 14 and 15 and positioned for placing over a patient's teeth for alignment of line 14 with the contacts of the first premolar. The x-ray tube is aligned with the lines 14 and 15 and with the lines 16 and 17 and line 19 and with the patient's teeth and the teeth x-rayed with the x-ray tube aligned on the bite tab to thereby aid in the alignment of the x-ray tube on the patient's teeth. The process may also include the steps of making a dental film holder by selecting an existing film packet, forming the bite tab with adhesive on one side and a pair of openings therein and having alignment lines on the other side from the adhesive, then folding the alignment tab to align a pair of openings on the wing portion while folding the two end portions of the tab for adhesively attaching to the film packet.

It should be clear at this time that a dental x-ray film holder has been provided and a method for making and using the film holder for aligning an x-ray tube with the proper teeth and film holder for x-raying a patient's teeth with a bitewing type film holder. However, the present invention is anticipated to apply to different shapes of film holders and bite tabs and with different size openings 13 without departing from the spirit and scope of the invention. Accordingly, the present invention is not to be considered limited to the forms shown which are to be considered illustrative rather than restrictive.

I claim:

1. A dental x-ray film holder comprising:

a film packet for holding x-ray film and having a predetermined size to fit adjacent at least one tooth in a patient's mouth;

a bite tab attached to and extending from said film packet, said bite tab adapted to be gripped between the teeth to hold the film packet adjacent teeth, and said bite tab having an opening of a predetermined size therethrough to align said bite tab and film packet with at least one tooth in a patient's mouth; and aligning means on said bite tab for aiming an x-ray tube directly at said film packet held adjacent said teeth for X-raying said teeth, said aligning means having a plurality of parallel alignment lines on said bite tab positioned for alignment with an x-ray tube whereby an x-ray tube can be aligned with predetermined teeth and the x-ray film held adjacent thereto.

2. A dental x-ray film holder in accordance with claim 1 in which said aligning means has two parallel alignment lines on said bite tab positioned for alignment with an x-ray tube.

3. A dental x-ray film holder in accordance with claim 2 in which said aligning means has at least one alignment line on said bite tab extending generally perpendicular to said parallel alignment lines on said bite tab and positioned for alignment with an x-ray tube.

4. A dental x-ray film holder in accordance with claim 2 in which said aligning means has two parallel alignment lines extending generally perpendicular to said two parallel alignment lines on said bite tab and positioned for alignment with an x-ray tube.

5. A dental x-ray film holder in accordance with claim 1 in which said bite tab is adhesively attached to said film packet.

6. A dental x-ray film holder in accordance with claim 1 in which said bite tab is sized to extend from a patient's teeth a distance to allow a portion of said aligning means to be visible for alignment with an x-ray tube when said patient bites on said tab.

7. A method of aligning an x-ray tube for x-raying a patient's teeth comprising the steps of:
    selecting a dental x-ray film holder having a film packet holding x-ray film and a bite tab having a plurality of aiming lines for aligning an x-ray tube thereon and said bite tab having an opening therein to visualize at least one tooth for alignment of said x-ray film holder therewith and having a pair of parallel aiming lines thereon;
    placing said selected x-ray film holder in a patient's mouth adjacent the patient's teeth;
    aligning an x-ray tube with said lines on said bite tab; and
    x-raying a patient's teeth with said x-ray tube aligned on said bite tab thereby aiding alignment of an x-ray tube on a patient's teeth.

8. A method of aligning an x-ray tube for x-raying a patient's teeth in accordance with claim 7 in which the step of selecting a dental x-ray holder includes selecting an x-ray holder having a bite tab having at least one aiming line therein generally perpendicular to said pair of parallel aiming lines thereon.

* * * * *